Nov. 10, 1925.  
A. A. BUSH  
1,561,214  
ENGRAVING MACHINE  
Filed Aug. 19, 1922 7 Sheets-Sheet 2

Inventor  
Albert A. Bush  
By

Nov. 10, 1925.  
A. A. BUSH  
ENGRAVING MACHINE  
Filed Aug. 19, 1922  
1,561,214  
7 Sheets-Sheet 3

Inventor  
Albert A. Bush  
Attorney

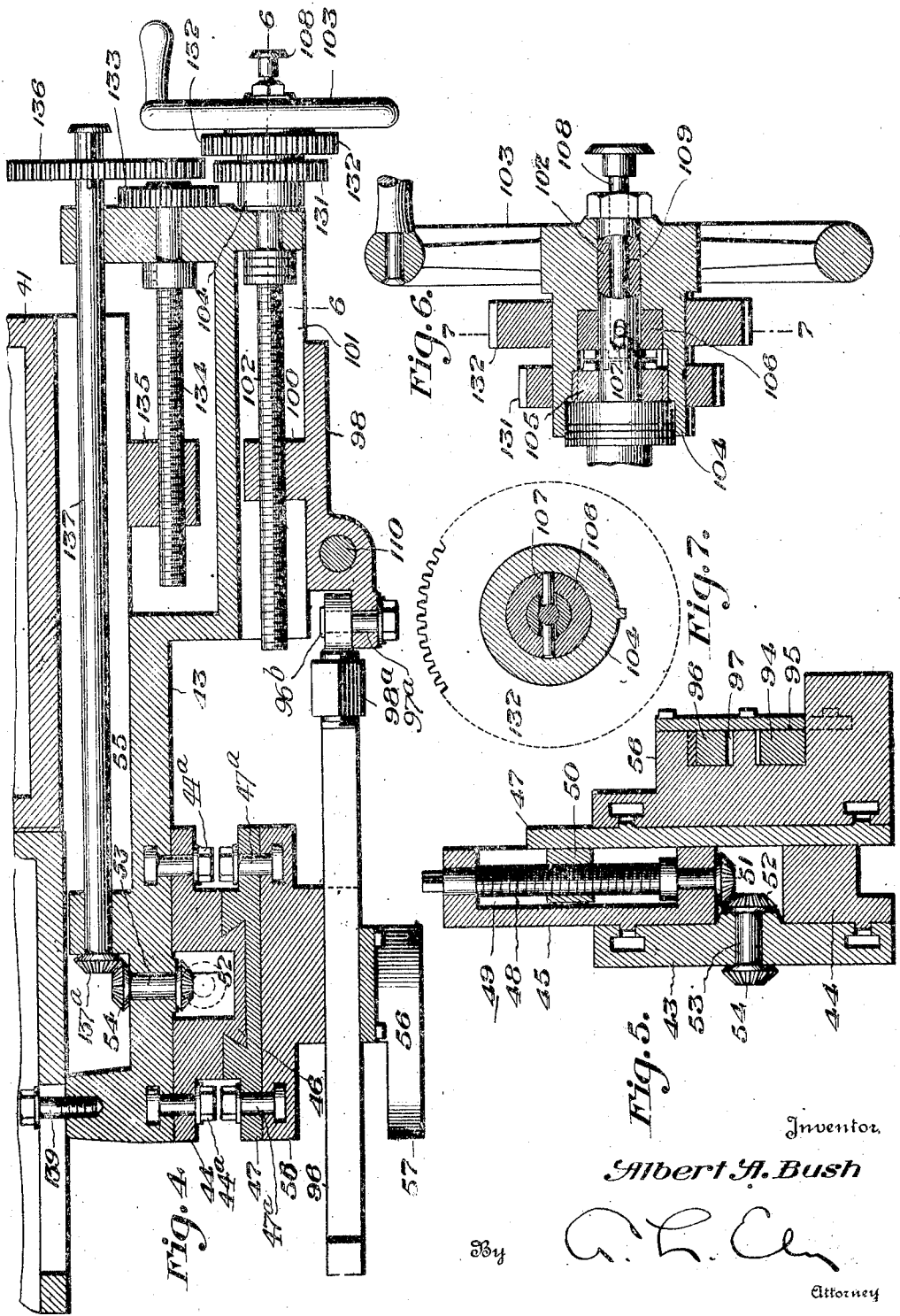

Nov. 10, 1925. 1,561,214
A. A. BUSH
ENGRAVING MACHINE
Filed Aug. 19, 1922 7 Sheets-Sheet 5
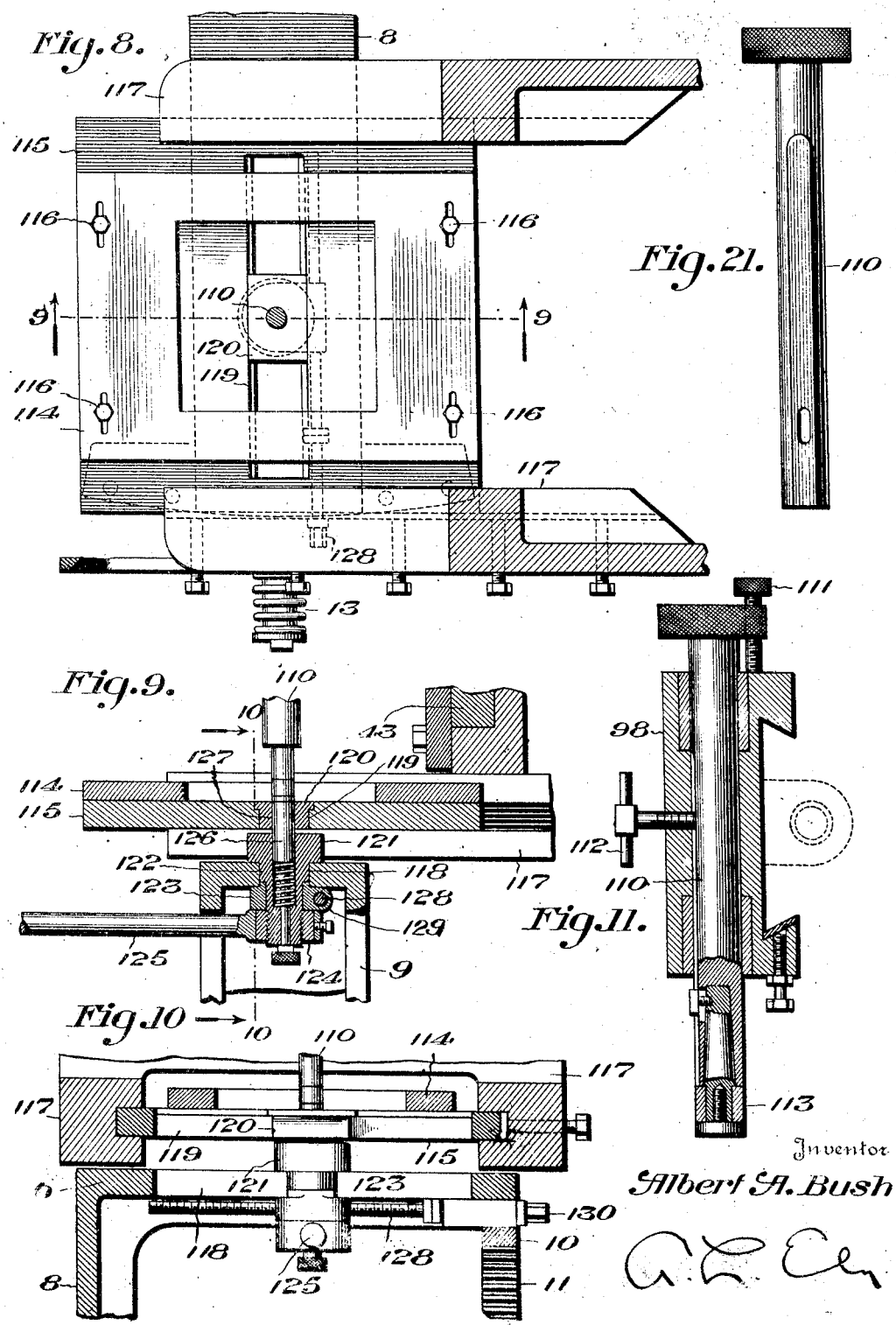

Nov. 10, 1925.
A. A. BUSH
1,561,214
ENGRAVING MACHINE
Filed Aug. 19, 1922    7 Sheets-Sheet 6
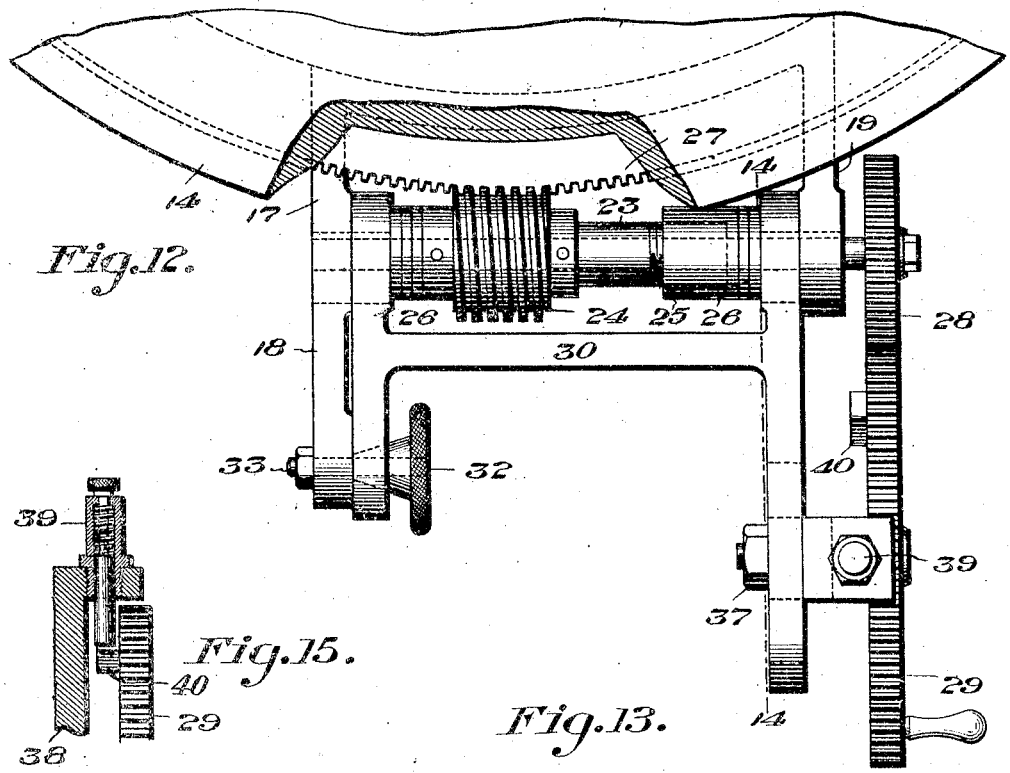
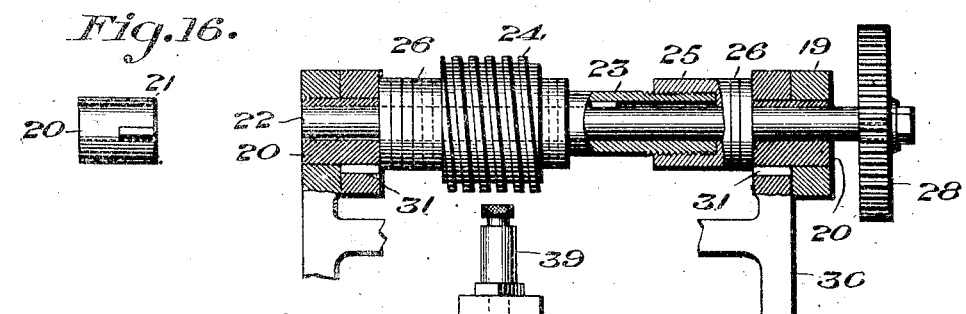
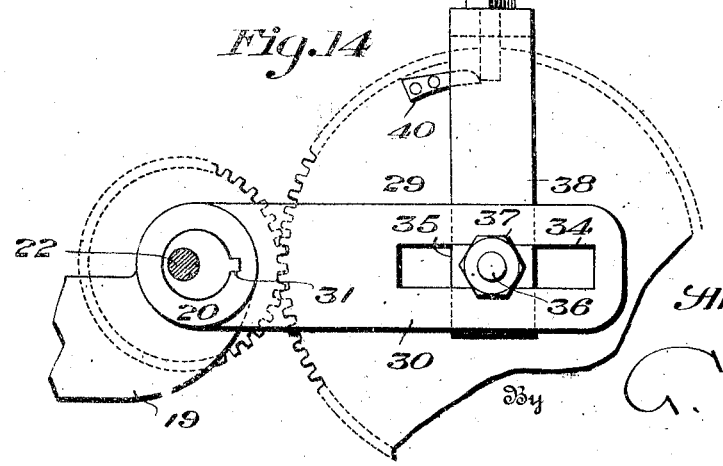
Inventor
Albert A. Bush
By
Attorney

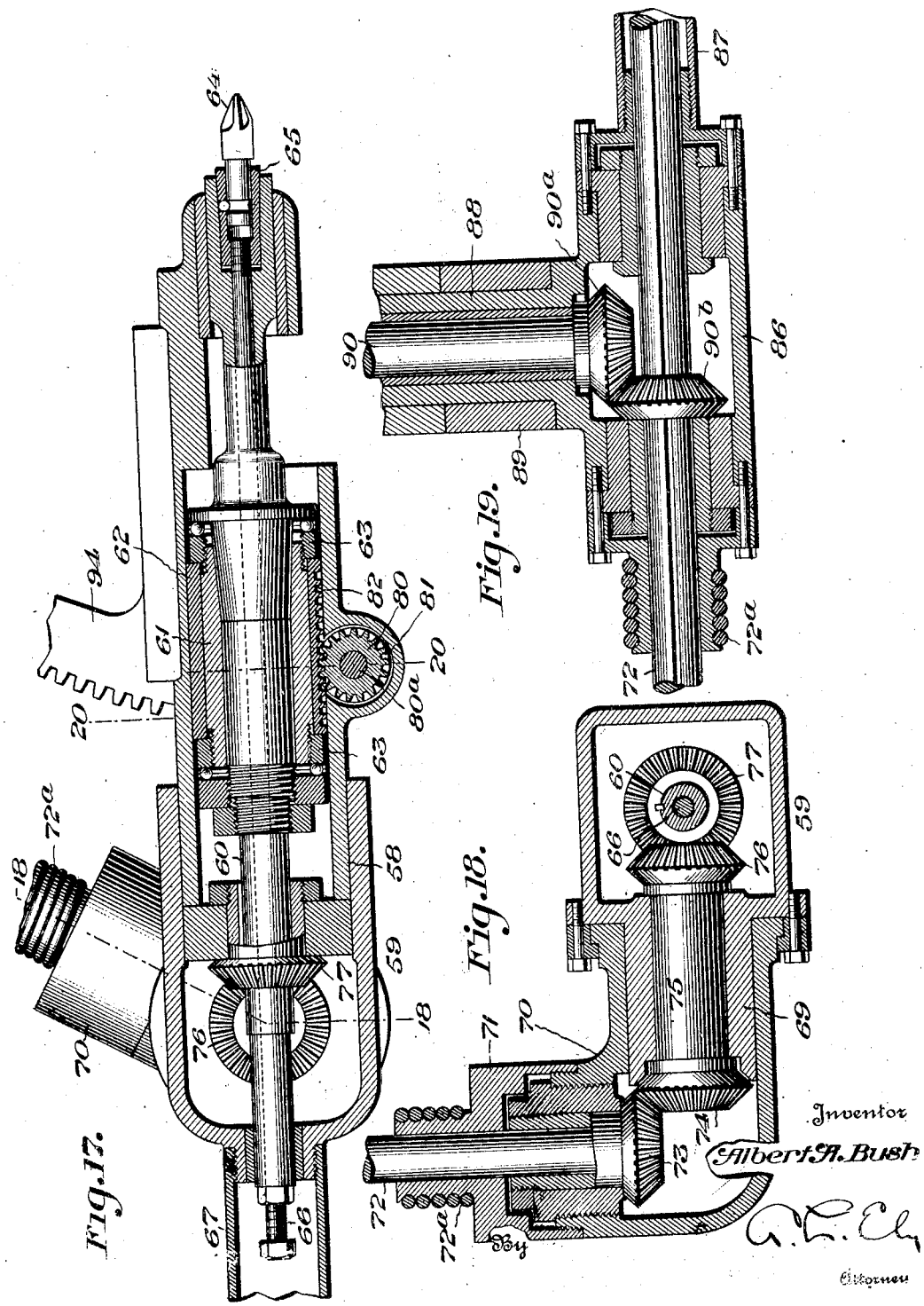

Patented Nov. 10, 1925.

1,561,214

UNITED STATES PATENT OFFICE.

ALBERT A. BUSH, OF AKRON, OHIO, ASSIGNOR TO THE FIRESTONE TIRE AND RUBBER COMPANY, OF AKRON, OHIO, A CORPORATION OF OHIO.

ENGRAVING MACHINE.

Application filed August 19, 1922. Serial No. 582,900.

*To all whom it may concern:*

Be it known that I, ALBERT A. BUSH, a citizen of the United States, residing at Akron, in the county of Summit, State of Ohio, have invented certain new and useful Improvements in Engraving Machines, of which the following is a specification.

My invention relates to improvements in engraving machines for use in reproducing a pattern upon the inner face of an annular object, and it is particularly designed for use in cutting non-skid patterns on the working face of the type of mold commonly utilized in vulcanizing pneumatic tires.

In conjunction with Richard H. Freitag, I have disclosed, in Patent No. 1,385,333, a mold engraving machine adapted for reproducing a pattern unit at intervals upon the working face of a mold by means of a cutting tool which is controlled by a templet plate.

The purpose of the present invention is to provide an improved machine over that shown in said patent, the principal improvement, generally speaking, residing in the provision of a more flexible mechanism, that is to say, one that is capable of a wider range of adjustment, and hence a more extended range of operation and greater utility.

Another object of the invention is to provide an improved indexing means whereby a pattern unit may be more accurately reproduced at predetermined intervals within a given circumference of mold surface.

Other objects are the provision of an improved form of driving mechanism for the cutting tool, and an improved mounting for the templet plate.

Other objects inherent in my invention, together with the advantages of the arrangement and the construction of parts embodied therein, will appear when the following description is read in conjunction with the drawings accompanying and forming a part of this specification.

In said drawings:

Figure 4 is a horizontal section, on an enlarged scale, taken on the line 4—4 of Figure 1;

Figure 5 is a transverse section, on an enlarged scale, taken on the line 5—5 of Figure 1;

Figure 6 is a longitudinal sectional view taken on the line 6—6 of Figure 4 and drawn to an enlarged scale;

Figure 7 is a transverse sectional view taken on the line 7—7 of Figure 6;

Figure 8 is a horizontal section taken on the line 8—8 of Figure 6;

Figure 9 is a transverse sectional view taken on the line 9—9 of Figure 8;

Figure 10 is a longitudinal sectional view taken on the line 10—10 of Figure 9;

Figure 11 is a vertical sectional view illustrating the manner of mounting a templet follower utilized in conjunction with my invention;

Figure 12 is a plan view, partly in section, illustrating the indexing mechanism of my invention;

Figure 13 is a horizontal sectional view taken through a portion of said indexing mechanism;

Figure 14 is a transverse sectional view taken on the line 14—14 of Figure 12;

Figure 15 is a detail sectional view illustrating a stop device embodied in the indexing mechanism;

Figure 16 is a detail view of a bushing forming a part of the indexing mechanism;

Figure 17 is a longitudinal sectional view drawn on an enlarged scale and illustrating the manner of supporting and driving the cutting tool of my invention;

Figure 18 is a transverse sectional view taken on the line 18—18 of Figure 17;

Figure 19 is a horizontal sectional view taken on the line 19—19 of Figure 1 and drawn on an enlarged scale;

Figure 20 is a transverse sectional view taken on the line 20—20 of Figure 17; and Figure 21 is a detail view of the templet follower.

Figure 1:
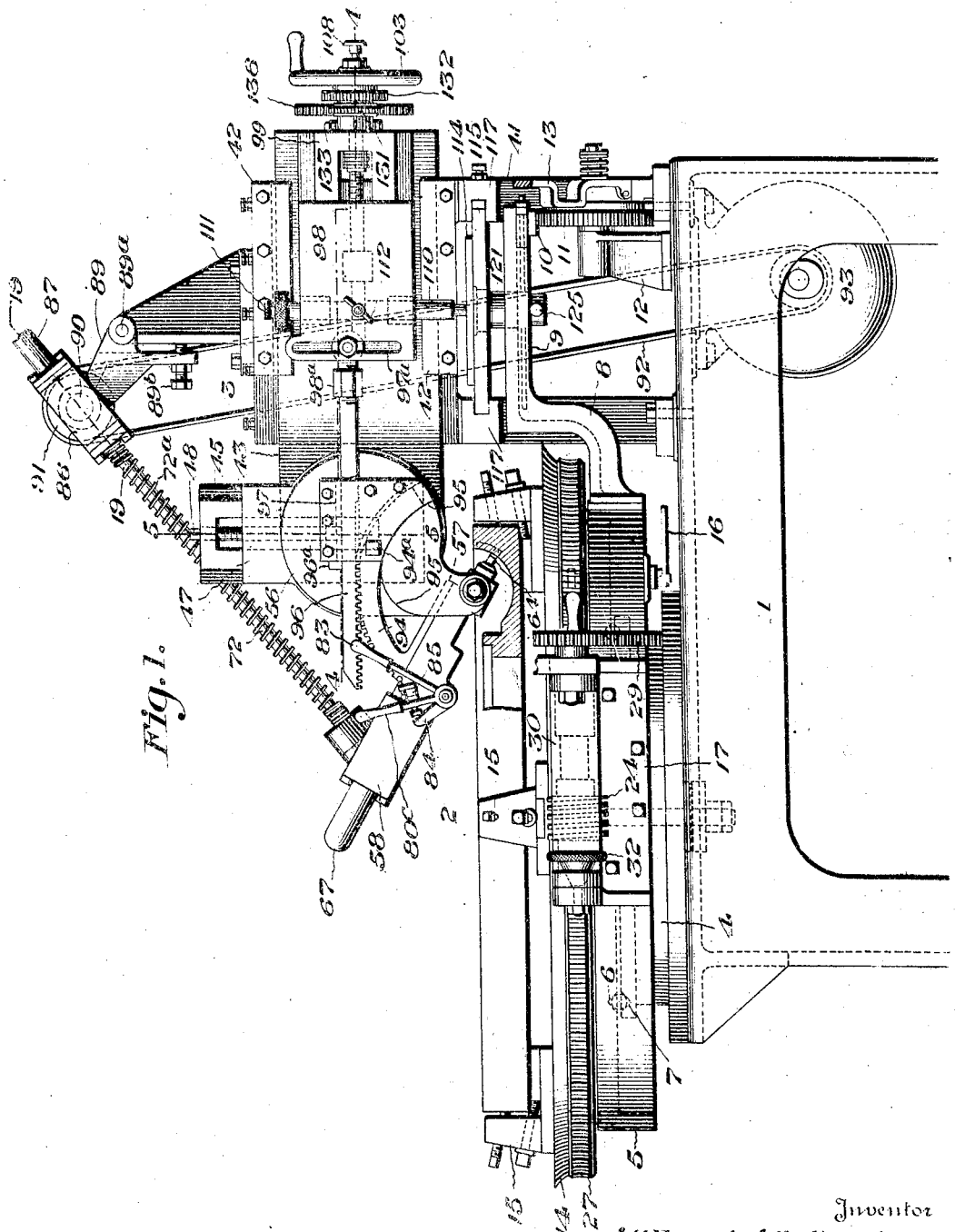
Figure 1 is a side elevation illustrating a preferred form of the invention, parts being broken away and shown in section.
Figure 2:
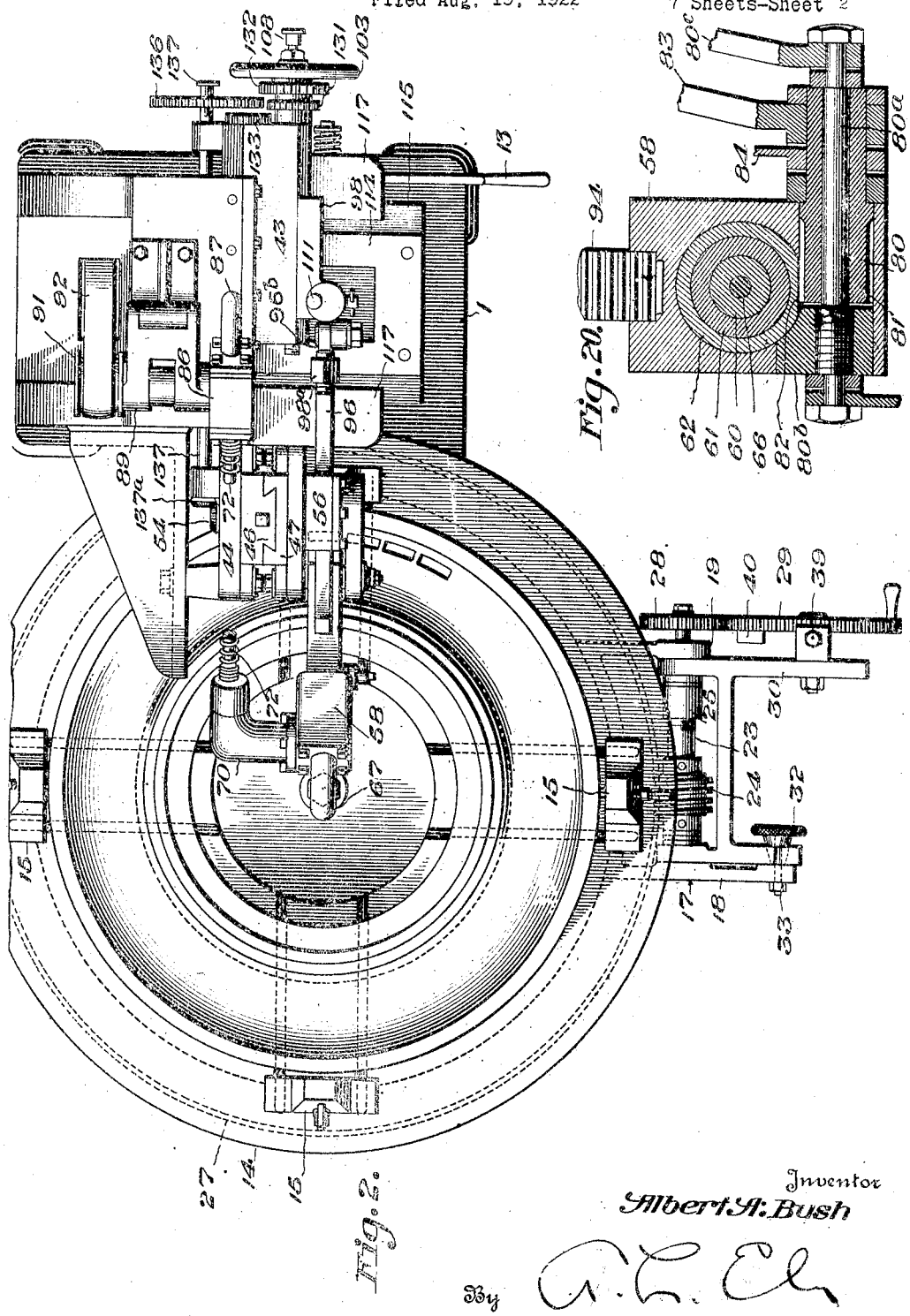
Figure 2 is a top plan view of Figure 1.

The machine, briefly described, comprises a base 1, of substantially rectangular form, upon which there is mounted a mold supporting and adjusting unit 2 and a tool supporting and operating unit 3, the units being relatively arranged and constructed in a manner presently described.

Unit 2 is constructed as follows: Adjacent what may be termed the forward end of the table there is suitably affixed a circular bearing plate 4 that is designed to support upon its upper face a second circular bearing plate 5. The bearing plate 5 is adapted to be oscillated concentrically of the plate 4, as will presently appear, and to this end the plates are provided with cooperating race-ways 6 for receiving suitable anti-friction bearings 7. Upon the peripheral face of the plate 5, a goose-neck bracket 8 is mounted in a position to extend radially from the plate and toward the rear end of the machine. The bracket 8 embodies a horizontal portion 9 that is preferably disposed above the level of the table 5 to form a support presently referred to. At its free extremity, the portion 9 of the bracket 8 is provided with a toothed segment 10 arranged concentrically of the axis of oscillation of the plate 5. A toothed pinion 11 is mounted below the support 9 in a suitable bearing 12, to mesh with the segment 10. The pinion 11 is adapted to be oscillated by any suitable form of hand lever and detent, such as that disclosed in the aforesaid patent and shown conventionally at 13.

Upon the plate 5, a circular turn-table 14 is arranged for rotation concentrically thereof. The turn-table is designed to support the mold and is provided with radially adjustable clamps 15, of any suitable form, whereby the mold may be centered and held in concentric position relative to the axis of rotation of the table and also the axis of oscillation of the plate 5. At a point convenient to the operator, a hand lever 16 is provided that is adapted to operate any suitable form of clamping device whereby the turn-table 14 may be locked to the plate 5 to be oscillated therewith for a purpose presently set forth.

Indexing means for rotating the turn-table 14 upon the plate 5 are provided, comprising the following: A bracket 17, having spaced horizontal arms 18 and 19, is secured upon the peripheral face of the plate 5 in position to project substantially radially therefrom. Each of the arms 18 and 19 serves as a mounting for an individual sleeve 20, the sleeves being rotatable in their respective arms about a common horizontal axis adjacent the plate 5. Each sleeve is adapted to project from its associated arm to provide a concentric hub portion 21, for a purpose presently apparent. A rotary shaft 22 is journaled in the sleeves 20 for adjustment excentrically of their axis of rotation and has splined thereon a sleeve 23 which carries a worm 24. End thrust bearings 26 are interposed between the ends of the sleeve 23 and the sleeves 20, and one end of the sleeve 23 is threaded to receive a nut 25 for taking up wear of the bearings 26. Worm 24 is designed to be meshed with a worm gear 27 mounted upon the peripheral face of the turn-table 14, and is rotated by means of interchangeable indexing gears, one of which is shown at 28 as affixed upon one end of the shaft 22. The indexing gear 28 is rotated by a manually operated master gear 29, carried upon one arm of an H-shaped yoke 30. The yoke, in its operative position, projects horizontally from between the arms 18 and 19. The inner ends of the yoke 30 are keyed respectively, as at 31, upon the hubs 21 of the sleeves 20 and it is retained in a horizontal position by means of a thumb nut 32 and bolt 33 adapted to lock it to the arm 18 of the bracket 17. The arm upon which the master gear 29 is carried is slotted, as at 34, to receive a slidable bearing block 35. A short shaft 36 extends through the block 35 and serves as a bearing for the master gear 29, the shaft at its inner end being threaded to receive a nut 37, whereby the block and the parts carried thereby may be clamped in any desired position upon the yoke 30. A standard 38 is carried by the block 35 and serves as a mounting for a spring pressed stop 39 that is designed to engage a cam 40 fast upon one face of the master gear 29 when said gear has completed its cycle of rotation.

The foregoing indexing devices are designed to serve the following purpose and to be operated as follows: The indexing gear 28 is constructed with the number of teeth corresponding to the number of divisions into which it is desired to divide the mold surface to reproduce a pattern at equal intervals around said surface. The master gear 29 has the same number of teeth as the worm gear 27 upon the turn-table 14. When a unit of the pattern has been cut by means presently described, the operator first unlocks the table 14 from the plate 5 by means of the lever 16 previously referred to. The master gear 29 is then rotated through a complete cycle, this operation being gauged by the stop 39 and cam 40. Through this operation the worm 24 and worm wheel 27 are actuated to rotate the turn table 14 upon the plate 5 and a new surface of the mold is moved into position to be operated upon. Obviously the spacing of the pattern may be changed by the substitution of indexing gears having different numbers of teeth, and the master gear 29 may be adjusted upon the yoke 30 by means of the slidable block 35 and nut 37, previously described, to accommodate larger or smaller indexing gears. When it is desired to rotate the turn table 14 freely, as when positioning and centering a mold thereon, the worm 24 may be disconnected from the worm gear 27 in the following manner:

The thumb screw 32 and bolt 33 are first actuated to disconnect the yoke 90 from the arm 18, whereupon the yoke 30 and the elements carried thereon will gravitate into a vertical position revolving the sleeves 20 in their arms 18 and 19. The shaft 22 and the worm 24, being mounted excentrically of the axis of rotation of the sleeves 20, it will be apparent that the worm 24 will be moved away from the worm wheel 27 and thus disengaged therefrom. At the same time gears 28 and 29 remain in mesh. By means of the stop 39 and the cam 40, the rotation of the mold may be automatically stopped at the regular intervals provided for by the ratios of the gears 28 and 29 as will be perceived.

The tool supporting and operating unit 3 comprises the following elements. A standard 41 arises from one rear corner of the base 1 and is provided upon the upper portion of its forward face with horizontal guideways 42 extending longitudinally of the base 1. A cross rail 43 is mounted in the guideways 42, the cross rail being of greater length than the guideway, whereby its forward end is adapted to overhang the cavity of the mold. Upon the overhanging end of the cross rail 43, a circular bearing block 44 is suitably affixed for adjustment about its axis, being secured in adjusted position by bolts 44ª, the block being provided with a vertical extension 45 and a vertical guide rail 46. Upon the guide rail 46, a second bearing block 47, similar in shape to block 44, is mounted for movement vertically thereof and also for adjustment with the block 44 about the axis of the latter. A vertically arranged screw shaft 48 is suitably journaled in a chamber 49 in the block 44, the threads of the shaft engaging a threaded lug 50 that is formed upon the block 47. By means of this screw shaft, block 47 may be moved vertically of block 44 for the purpose of moving the cutting tool in a straight line as will presently appear. The lower end of the shaft 48 carries a beveled gear 51 that meshes with a similar gear 52 fast upon a short shaft 53. Shaft 53 is journaled transversely of and in the cross rail 43 and also co-axially with the axis of rotation of the block 44. Upon the end of the shaft opposite the gear 52, a beveled gear 54 is mounted to project behind the cross rail 43 into a central longitudinal chamber 55 in back of rail 43.

A circular tool hanger 56 is mounted upon the face of the block 47, and disposed co-axially thereof for adjustment about the axis of the block, being secured by bolts 47ª. The tool hanger 56 is provided with depending ears 57 between which a tool holder or carriage 58 is fulcrumed to be moved in a vertical plane. The tool holder 58 comprises an elongated barrel 59 which is fulcrumed at one end between the aforesaid ears 57. The barrel 59 contains a longitudinally disposed hollow tool spindle 60 which is rotated in and has its intermediate portion surrounded by a sleeve 61. The sleeve 61 is mounted within a bushing 62 that is adapted for adjustment longitudinally of the barrel. End thrust bearings 63 are suitably arranged upon the spindle 60 and the sleeve 61 to prevent relative longitudinal movement of the bushing 62 and the spindle 60, whereby when the bushing is adjusted it provides for corresponding movement of said spindle. A milling tool 64 of any suitable type is clamped in the end of the chuck that is adjacent the fulcrum of the barrel by any suitable devices, such as the spring collet indicated at 65. In the embodiment of the tool shown, the collet is actuated by means of an adjustable rod 66 extending through the spindle, and beyond the member 58. The barrel may be provided with a dust cap 67 to cover the extended end of the rod.

The end of the barrel 59, opposite the tool 64, is provided with a horizontal sleeve 69 that projects laterally therefrom. One end of a hollow elbow 70 surrounds the sleeve 69 for oscillating movement thereon, the opposite end 71 of the elbow projecting upwardly at an angle to the perpendicular. The projecting end of the elbow 71 receives the lower end of a drive shaft 72 which is provided with a beveled gear 73 which meshes with the gear 74 fast upon the outer end of a short horizontal shaft 75. Shaft 75 is journaled in the sleeve 69 and carries a beveled gear 76 upon its inner end which in turn meshes with a beveled gear 77. Gear 77 is splined upon the spindle 60 so that the spindle may be rotated and yet adjusted, in a manner presently apparent, to vary the depth of the cut.

Any suitable means for adjusting the spindle may be utilized, but preferably a rotary sleeve 80 is journaled in the barrel transversely thereof and below the sleeve 62. One end of the sleeve is toothed, as at 81, Figure 20, to engage a rack 82 upon the bushing 62, whereby when the sleeve 80 is rotated the bushing 62, and likewise the parts carried thereby, are adjusted longitudinally of the barrel. A hand lever 83 is mounted upon the sleeve to rotate it and a relatively short lever 84 is also provided thereon. The lever 84 is designed to engage a suitable form of stop device, indicated at 85, whereby the depth of the cut may be accurately gauged. Any form of device having a micrometer adjustment may be utilized. A spindle 80ª extends through the sleeve 80 and is provided with a threaded end which carries a clamping nut 80ᵇ adapted to engage the bushing 62, whereby when the spindle 80ᵃ is rotated the bushing is clamped in position. The other end of the spindle 80ᵃ is provided with a hand lever 80ᶜ by which it may be operated.

Figure 3:
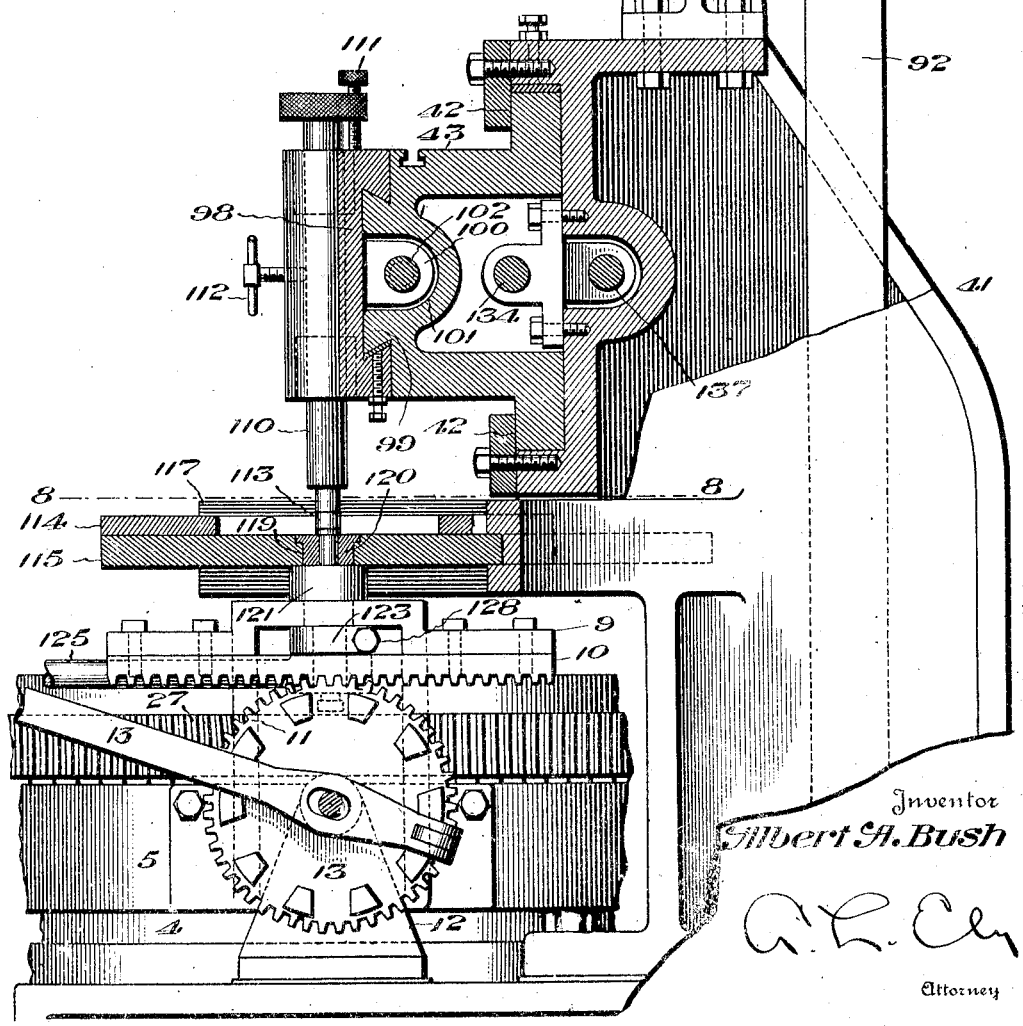
Figure 3 is an end elevation of a portion of the invention drawn to an enlarged scale, parts being broken away and shown in section.

The drive shaft 72, at its upper end, is journaled in an oscillatable housing 86 and projects therethrough, as shown in Figures 1 and 19. A dust cap 87 may be provided upon the housing to cover the projecting end of the shaft, if desired. The housing is provided with a laterally projecting sleeve 88 by means of which it is journaled to oscillate about an horizontal axis, in a bracket 89. Bracket 89 is adjustably mounted, upon the standard 41 about the point 89ᵃ and fixed by set screw 89ᵇ in the manner shown in Figures 1 and 3 of the drawings. A shaft 90 is journaled in the sleeve 88, whereby it extends at a right angle to the shaft 72. The inner end of the shaft is equipped with a beveled gear 90ᵃ which meshes with a similar gear 90ᵇ that is splined upon the shaft 72. Upon the outer end of the shaft 90 a belt pulley 91 is provided which is driven through a belt connection 92 from any suitable source of power, such as the motor indicated at 93. Between the housing 86 and the elbow 70 of the tool holder, a coil spring 72ᵃ surrounds the shaft 72 to assist in lifting the tool head. By means of this form of drive for the tool 64 and its connections with the barrel 59 of the tool holder 58, the holder and tool may be freely moved about their fulcrum, as will be obvious, while the tool is continuously driven.

The tool holder 58 and tool 64 are oscillated about their fulcrum through the following means: An arcuate rack 94 arises from an intermediate portion of the tool holder 58 concentric with the fulcrum point of said holder and is received in an arcuate guide slot 95 in the tool hanger 56. The rack 94 is engaged by the forward end of a straight rack 96, which is slidably mounted in a second guideway 97 in the hanger 56. The rack 96 is designed to be reciprocated in its guideway 97 in accordance with a pattern whereby the tool holder and tool are moved about their fulcrum to adjust the tool in a vertical plane. Through this adjustment the tool is caused to cut in a vertical arc, as will be apparent. A gib plate 96ᵃ is arranged in the guideway 97 above the rack 96, the plate being removable so that the rack 96 may be disconnected from the rack 94 for a purpose presently apparent.

The rack 96 is pivoted at its rear end to the bolt 96ᵇ for adjustment in a vertical slot 97ᵃ of a slide 98 and is made in two parts, the adjacent ends of which are oppositely threaded and connected together by a turnbuckle 98ᵃ. The slide 98 is adapted to be reciprocated upon a guide rail 99 upon the cross rail 43, whereby it is movable independently thereof. Upon its rear face the side 98 is provided with laterally projecting lug 100 which projects into a groove that is formed longitudinally of the cross rail 43, as at 101. A threaded longitudinally disposed shaft 102 is journaled at the rear end of the cross rail to project into the groove 101 and to engage the lug 100. At its rear end the shaft 102 projects to the rear of the cross rail 43 and is provided with a hand wheel 103 having a hollow hub portion 104 that is adapted normally to rotate freely about the shaft. Within the hub 104 a pair of annular opposed clutch members 105 and 106 respectively are mounted upon the shaft 102. Member 105 is freely rotatable about the shaft 102 and is keyed to the hub portion 104. Member 106 is pinned to the shaft 102, as at 107, but is movable longitudinally thereof so that it may be moved to clutch the member 105 and clutch the shaft thereto. A clutch operating rod 108 is slidably mounted in a longitudinal bore 109 in the end of the shaft 102 and is suitably connected to the member 106 to move it into and out of engagement with the member 105. By means of the foregoing construction, the screw shaft 102 may be actuated to reciprocate the slide 98 upon the cross rail 43.

A templet follower 110 is mounted upon the slide 98 for vertical adjustment relative thereto by means of a knurled hand screw 111. The follower may be clamped in any adjusted position by means of a binding screw 112. At its lower end the templet follower is provided with a roller 113 which engages a horizontally disposed templet or pattern plate 114.

A horizontally disposed slide 115 is provided beneath the templet follower 110 to support the templet plate. Bolts or screws serve to lock the plate 114 upon the slide 115, as shown at 116. The slide 114 is mounted in horizontal guide arms 117 that project from the standard 41 and extend transversely of and over the support 9 previously referred to. As best shown in Figures 1 and 8, the arrangement of the templet plate 114 and the slide 115 is such that these elements may be moved between the guide arms 117 of the standard 41 and beneath the templet follower 110, when the arm 8 and the table 5 are oscillated through the operation of the lever 13 previously described. By thus oscillating the slide 115 and the plate 114 with the mold, the action of the cutting tool is directed circumferentially of the mold, as will be readily understood without further explanation.

The plate 114 and the slide 115 are secured to the support in the following manner: The support 9 is provided with a slot 118 adapted to extend radially of the mold and the slide 115 is provided with a coextensive slot 119 substantially parallel with the slot 118. A slide block 120 is received in the slot 119 to be moved longitudinally thereof. A headed sleeve 121 is disposed in the slot 118 in vertical alignment with the block 120 and is provided with an intermediate squared portion 122 adapted to slide in the slot 118. Below the portion 122 the sleeve is provided with a collar 123 which engages the under side of the support 9. The lower end of the sleeve 121 is threaded to receive a nut 124 by means of which the collar 123 may be clamped against the under side of the support 9 and the sleeve held against movement thereon. A suitable form of lever, such as that shown at 125, is provided for turning the nut 124. A spring pressed vertical pin 126 is mounted in the sleeve 121 and has its upper end projecting into a bore 127 in the block 120 whereby the block and sleeve are normally connected together.

Means are also provided for varying the distance between the sleeve 121, its associated parts, and the center of the mold to vary the scale at which the pattern is reproduced circumferentially of the mold, or to maintain a fixed ratio between the pattern on the templet and the one cut in the mold for different sizes of molds. This comprises the following: A threaded shaft 128 is mounted upon the arm 8 below the support 9 in position to parallel the slot 118 and to project through a threaded bore 129 in the collar 123. One end of the shaft 128 is rotatably mounted in a suitable bearing on the arm 8 in which it is held against endwise movement. The shaft is provided with a headed portion 130 by means of which it may be turned in its bearing to move the sleeve 121 and the block 120 in their respective slots 118 and 119.

Upon the hub 104 of the wheel 103, two gears 131 and 132 respectively are splined for adjustment longitudinally thereof. Gear 131 is designed to be moved by the operator upon the hub 104 into mesh with a gear 133 which is fixed upon the rear end of a threaded shaft 134. The shaft 134, at one end thereof, is journaled against longitudinal movement on the cross rail 43, and is disposed parallel with the shaft 102 previously described. Intermediate its length, shaft 134 engages a threaded lug 135 fixed upon the standard 41. The gear 132 is designed to be placed into mesh with a gear 136 which is feathered upon the rear end of a shaft 137. The shaft 137 has its end portions journaled in the cross rail 43 and is also disposed in parallelism with shaft 102. The forward end of the shaft 137 is provided with a beveled gear 137$^a$ that meshes with the gear 54 upon the previously described shaft 53. The shaft 134 is designed to be operated to adjust the entire tool carrying head with respect to the mold. The shaft 137 is used when the tool is to be moved in a straight line by movement of the cross rail 43 on the guide 46. Set screw 139 holds the cross rail in fixed position relative to the standard.

In operating my invention, the mold is first centered upon the turn-table 14; the indexing devices, previously described, being preferably disconnected from the worm gear 27. Assuming that the operator desires to place a plurality of arcuate cuts at regular intervals in the tread wall of the mold cavity, the cuts to be concentric of said tread wall, the tool holder is next positioned with its fulcrum point on the radius center of said wall, the shaft 134 being used to properly locate the tool. A pattern plate 114, having the proper longitudinal dimension of pattern to produce the height of the cut, is next positioned upon the slide 115 and the templet follower 110 adjusted to follow the pattern therein. The manner in which these dimensions of the pattern are ascertained, it is believed, need not be entered into in this description. The tool 64 is next adjusted to cut to the proper depth by means of the hand lever 83 and its associated parts previously described, and the lever 80$^c$ and clamp nut 80$^b$ adjusted to clamp the tool in its adjusted position. The proper indexing gear 28 having been selected to secure an equi-distant spacing of the cuts, the driving mechanism is now set in motion. In order to obtain the proper width of cut, the mold is oscillated by means of the lever 13 to move the pattern about the templet follower, as will be clear from the previous description of these parts. In order to move the tool vertically upon its fulcrum, the hand wheel 103 is clutched to the shaft 102 by means of the rod 108, in the manner previously set forth, and the shaft 102 rotated to reciprocate the slide 98 and the rack 96, thus rocking the tool holder 58 upon its fulcrum. The action of the slide 98 is, of course, controlled by the longitudinal dimension of the pattern to regulate the range of movement of the tool in a vertical direction.

Should the operator desire to cut in a straight line at any angle, the procedure is as follows: Rack 96 is disconnected from rack 94, and may be removed by removing the bolt 96$^b$. Blocks 44, and 47, together with the tool hanger 56, are rotated about their axes to position the guide rail 46 at the angle required. Hanger 56 is again adjusted about its axis to position the fulcrum of the tool upon the radius center of the mold wall and the tool holder 58 adjusted about its fulcrum to position the tool 64 at a right angle to the guide rail 46. The tool 64 and holder 58 are locked in position relative to the rail 46 by means of bolt 94ª which engages the segment 94. The operator may mesh the gear 132 with the gear 136. Upon rotation of the hand wheel 103, shaft 137 and the beveled gear connections 137ª, 54, 52 and 51, the shaft 49 will be rotated to raise or lower the block 47 upon the rail 46, and hence the hanger 56 and tool 64.

The foregoing is a detailed description of a preferred embodiment of my invention, but it is to be understood that modifications in the details of construction and the arrangement of the several parts may be resorted to without departing from the spirit of the invention or the scope of the appended claims.

What I claim is:

1. A machine for engraving annular objects comprising in combination, an oscillatable support for the object, a movable tool fulcrumed to cut transversely of the object, means operable to move the tool to cut in an arcuate path, means operable to move the fulcrum of the tool to vary the radius of the arc of the cut, means operable to move the tool to cut in a straight path, and means common to each of said other means operable to actuate selectively either of said other means.

2. A machine for engraving annular objects comprising in combination, an oscillatable support for the object, a movable tool fulcrumed to cut transversely of the object, a floating drive shaft for the tool arranged at an angle thereto, means for moving the tool to cut in an arcuate path, and means adapted to be selectively employed for moving the tool to cut in a straight path.

3. A machine for engraving annular objects comprising in combination, an oscillatable support for the object, a movable tool fulcrumed to cut transversely of the object, a floating drive shaft for the tool arranged at an angle thereto, means for moving the tool to cut in an arcuate path, and means adapted to be selectively employed for moving the tool to cut at an angle.

4. A machine for engraving annular objects comprising in combination, an oscillatable support for the object, a movable tool fulcrumed to cut transversely of the object, a floating drive shaft for the tool arranged at an angle thereto, means for moving the tool to cut in an arcuate path means for moving the tool to cut at an angle, and means common to said first and second means operable to actuate either of said means.

5. A machine for engraving annular objects comprising in combination, an oscillatable support for the object, a movable tool fulcrumed to cut transversely of said object, a floating drive shaft for the tool arranged at an angle thereto, means operable to move the fulcrum of the tool to vary the radius of the cut, means operable to move the tool to cut at an angle, and means common to each of said other means operable selectively to actuate either of said other means.

6. A machine for engraving annular objects comprising in combination, an oscillatable support for the object, a movable tool fulcrumed to cut transversely of the object, means for rotating the object upon the support to space the cuts at equal intervals therein, means for moving the tool to cut in an arcuate path, means adapted to be selectively employed for moving the tool to cut at an angle, and a floating drive shaft for the tool arranged at an angle thereto.

7. A machine for engraving annular objects comprising in combination, an oscillatable support for the object, a movable tool fulcrumed to cut transversely of the object, means for rotating the object upon the support to space the cuts at regular intervals therein, a pattern element connected to the support, means including a pattern follower operable to move the tool to cut at an angle, and a floating drive shaft for the tool arranged at an angle thereto.

8. A machine for engraving annular objects comprising in combination, an oscillatable support for the object, a movable tool fulcrumed to cut transversely of the object, means for rotating the object upon the support to space the cuts at regular intervals therein, a pattern element attached to the support, means including a pattern follower operable to move the tool to cut at an angle, a floating drive shaft for the tool arranged at an angle thereto, and means for adjusting the pattern element relative to the support.

9. A machine of the class described comprising in combination, an oscillatable support for the object, a movable tool fulcrumed to cut transversely of the object, means including an interchangeable gear drive for rotating the object upon the support, a pattern element mounted upon the support for adjustment radially of the object, means including a pattern follower operable to move the tool to cut in an arcuate path, means operable to move the tool to cut at an angle, means common to said other means operable selectively to actuate either of said other means, and a floating drive shaft for the tool arranged at an angle thereto.

10. A machine of the class described comprising in combination, an oscillatable support for the object, a movable tool fulcrumed to cut transversely of the object, devices including an interchangeable gear drive for rotating the object upon the support, a pattern element mounted upon the support for adjustment radially of the object, means including a pattern follower operable to move the tool to cut in an arcuate path, means operable to move the fulcrum of the tool to vary the radius of the arc of the cut, means for moving the tool to cut at an angle, and means common to said other means operable selectively to actuate either of said other means.

11. A machine of the class described comprising in combination, an oscillatable support for the object, a movable tool fulcrumed to cut transversely of the object, devices including an interchangeable gear drive for rotating the object upon the support, a pattern element mounted upon the support for adjustment radially of the object, means including a pattern follower operable to move the tool to cut in an arcuate path, means operable to move the fulcrum of the tool to vary the radius of the arc of the cut, means for moving the tool to cut at an angle, means common to said other means operable selectively to actuate either of said other means, and a floating drive shaft for the tool arranged at an angle thereto.

12. In a machine for engraving annular molds, in combination, an oscillatable mold support operable to move the mold about its axis, a carriage movable across the mold annulus, a tool fulcrumed upon the carriage and adapted to be positioned in the mold cavity, a pattern element mounted upon the support for adjustment radially of the mold, a movable pattern follower, a removable connection between the follower and the tool, and actuating mechanism common to the carriage and the follower operable to move either said carriage or said follower.

13. In a machine for engraving annular molds, an oscillatable mold support operable to move the mold about its axis, a pattern element mounted upon the support for adjustment radially of the mold, a tool carriage movable horizontally across the mold annulus, a vertical guide rail pivoted upon the carriage for adjustment into an inclined position, a tool hanger movable upon the guide rail, a fulcrumed tool upon the hanger, a movable pattern follower on the carriage adapted to move the tool about its fulcrum, and actuating mechanism common to the tool hanger and the follower for selectively moving either the hanger or the follower.

14. In a machine for engraving annular molds, in combination, means for supporting and oscillating a mold about its axis, means for rotating the mold upon the support with a step by step movement, a tool carriage adapted for movement across the mold annulus, a tool fulcrumed upon the carriage to cut transversely of the mold, a pattern element mounted upon the support for adjustment radially of the mold, a pattern follower upon the carriage adapted for movement thereon to move the tool upon its fulcrum in accordance with the pattern, and means for adjusting the tool on the carriage to cut at an angle.

15. In a machine for engraving annular molds, in combination, means for supporting and rotating a mold in a horizontal position, means for oscillating said first means about its axis, a tool carriage movable across the mold annulus, a tool fulcrumed upon the carriage to cut in an arcuate path, a floating drive shaft for the tool arranged at an angle thereto, and a common actuating mechanism for moving either the tool or the carriage.

16. In a mold engraving machine, in combination, a rotatable mold support, an oscillatable support for the rotatable support, and means operable to rotate the former upon the latter with a step by step movement and to automatically stop said rotation at regular intervals said means being mounted upon one of the supports for adjustment into inoperative position.

17. In a machine for engraving annular molds, in combination, a rotatable table adapted to support molds of varying circumferences, an oscillatable support for the rotatable table, and means operable to rotate the former upon the latter and to stop said rotation at regular intervals said means including devices for varying the intervals in accordance with the circumference of the mold.

18. In a machine for engraving tire molds, a pivoted tool holder, a rotating tool in said holder, a rigid drive shaft for said tool, pivoted bearings for the ends of the drive shaft, and means permitting longitudinal movement of the shaft in one of said bearings.

19. In a machine for engraving tire molds, a pivoted tool holder, a rotating tool in said holder, a rigid drive shaft for said tool, pivoted bearings for the ends of the drive shaft, means permitting longitudinal movement of the shaft in one of said bearings, means for rocking the tool holder, and counter-balancing means for the tool holder.

20. In a machine for engraving tire molds, a mold supporting table pivotally mounted at the center of the mold, a pattern connected to said table, a pivoted cutting tool over the mold, means controlled by the pattern for moving the cutting tool said means moving in a straight line, and a connection between the pattern and the table for moving the former rectilinearly.

21. In a machine for engraving tire molds, a mold supporting table pivotally mounted at the center of the mold, a movable cutting tool over the mold, tool moving means, a pattern follower carried on said moving means, a pattern, means for guiding the pattern in a straight line at an angle to the path of the tool-moving means, and a connection between the supporting table and the pattern.

22. In a machine for engraving tire molds, a mold supporting table pivotally mounted at the center of the mold, a movable cutting tool over the mold, tool moving means, a pattern follower carried on said moving means, a pattern, means for guiding the pattern in a straight line at an angle to the path of the oscillating means, a connection between the supporting table and the pattern, and means for adjusting the pattern toward or away from the center of the mold.

23. In a machine for engraving tire molds, a table, a pivotal mounting for said table, means for securing a mold with the center thereof over the pivot of the table, an extension on said table, an upright, a guideway arranged outside of the mold, a pattern movable in said guideway, and means connecting the table and the pattern.

24. In a machine for engraving tire molds, a table, a pivotal mounting for said table, means for securing a mold with the center thereof over the pivot of the table, an extension on said table, an upright, a guideway arranged outside of the mold, a pattern movable in said guideway, means connecting the table and the pattern, an oscillating mold cutting tool, and a pattern follower connected to said tool.

25. In a machine for engraving tire molds, a table, a pivotal mounting for said table, means for securing a mold with the center thereof over the pivot of the table, an extension on said table, an upright, a guideway arranged outside of the mold, a pattern movable in said guideway, means connecting the table and the pattern, an oscillating mold cutting tool, a pattern follower connected to said tool, and means to adjust the pattern toward and away from the center of the mold.

ALBERT A. BUSH.